United States Patent
Fang (10) Patent No.: US 8,976,657 B2
(45) Date of Patent: Mar. 10, 2015

(54) METHOD AND SYSTEM FOR DATA OFFLOADING IN MOBILE COMMUNICATIONS

(75) Inventor: Yang Lit Fang, Singapore (SG)

(73) Assignee: Medium Access Systems Private Ltd., Singapore (SG)

(*) Notice: Subject to any disclaimer, the term of this patent is extended or adjusted under 35 U.S.C. 154(b) by 695 days.

(21) Appl. No.: 13/043,226

(22) Filed: Mar. 8, 2011

(65) Prior Publication Data

US 2012/0230191 A1 Sep. 13, 2012

(51) Int. Cl.
H04J 3/14 (2006.01)
H04W 36/22 (2009.01)
H04W 28/08 (2009.01)
H04W 36/00 (2009.01)

(52) U.S. Cl.
CPC .............. *H04W 36/22* (2013.01); *H04W 28/08* (2013.01); *H04W 36/0038* (2013.01); *H04W 36/0044* (2013.01)
USPC ........................................................ 370/235

(58) Field of Classification Search
None
See application file for complete search history.

(56) References Cited

U.S. PATENT DOCUMENTS

| 8,743,696 | B2* | 6/2014 | Chowdhury | 370/237 |
| 2009/0318124 | A1* | 12/2009 | Haughn | 455/418 |
| 2011/0287794 | A1* | 11/2011 | Koskela et al. | 455/509 |

FOREIGN PATENT DOCUMENTS

| WO | WO 2005/022831 A1 | 3/2005 |
| WO | WO 2008/088802 A2 | 7/2008 |
| WO | WO 2009/090848 A1 | 7/2009 |

OTHER PUBLICATIONS

Edible Apple, *AT&T makes switching from 3G to Wi-Fi networks a seamless transition*, http://www.edibleapple.com/att-makes-switching-from-3g-to-wi-fi-networks-a-seamless-transition/ Jun. 17, 2009, 8 pages.

* cited by examiner

*Primary Examiner* — Andrew Lai
*Assistant Examiner* — Leon Andrews
(74) *Attorney, Agent, or Firm* — James R. Klaiber; Pryor Cashman LLP (57) ABSTRACT

A mobile communications infrastructure with coordinated data session offloading of mobile subscriber devices from a primary communication medium to a secondary communication medium. The infrastructure comprises a primary communications infrastructure which provides a primary communications medium for mobile subscriber devices and a secondary communications infrastructure which provides a secondary communication medium that is accessible by authorized mobile subscriber devices. An offload management system is configured to control offload of mobile subscriber devices from the primary communication medium to the secondary communication medium during a data session with a data network based on an offload profile associated with the mobile subscriber device and resource status information relating to the available capacity of the secondary communication medium.

54 Claims, 4 Drawing Sheets

METHOD AND SYSTEM FOR DATA OFFLOADING IN MOBILE COMMUNICATIONS

FIELD

The present disclosure relates to a method and system for data offloading in mobile communications.

BACKGROUND

This section provides background information related to the present disclosure which is not necessarily prior art.

Current cellular networks tend to suffer Quality of Service (QoS) issues due to increases in the number of subscribers, and the increase in data required for the vast range of application programs available on mobile communication devices, such as multimedia streaming, video-chat, internet browsing, email and other application programs.

One method of addressing QoS issues is for operators of cellular networks to reduce cellular sizes by installing more base stations or cell-towers, but this significantly increases operating costs.

Most mobile devices, such as smart phones, include hardware that enables wireless communications over different types of mediums, for example a 3G cellular channel and a Wi-Fi channel. Configuring a mobile device for an initial connection to a Wi-Fi access point often requires the user to initiate login with a password for private access points. Additionally, once a connection to an access point is set-up, the mobile device then typically switches to the Wi-Fi channel for data sessions automatically when in range regardless of the quality of the data channel provided by the access point.

In this specification where reference has been made to patent specifications, other external documents, or other sources of information, this is generally for the purpose of providing a context for discussing the features of the disclosure. Unless specifically stated otherwise, reference to such external documents is not to be construed as an admission that such documents, or such sources of information, in any jurisdiction, are prior art, or form part of the common general knowledge in the art.

The present disclosure provides an improved method and system for data offloading in mobile communications, or at least provides the public with a useful choice.

SUMMARY

This section provides a general summary of the disclosure, and is not a comprehensive disclosure of its full scope or all of its features.

In a first aspect, the present disclosure broadly describes a mobile communications infrastructure with coordinated data session offloading of mobile subscriber devices from a primary communication medium to a secondary communication medium, comprising: a primary communications infrastructure which provides a primary communications medium for mobile subscriber devices; a secondary communications infrastructure which provides a secondary communication medium that is accessible by authorized mobile subscriber devices; and an offload management system configured to control offload of mobile subscriber devices from the primary communication medium to the secondary communication medium during a data session with a data network based on an offload profile associated with the mobile subscriber device and resource status information relating to the available capacity of the secondary communication medium.

The offload management system may comprise a policy server and a policy database that stores an offload profile for each mobile subscriber device, each offload profile comprising information indicative of whether the mobile subscriber device is approved for offloading.

The offload management system may comprise a resource server that is configured to maintain and provide resource status information indicative of the available capacity on the secondary communications infrastructure.

The offload management system may comprise an authentication, authorisation and accounting server that is configured to authenticate and authorise new connections to the secondary communications medium by offloading mobile subscriber devices and to receive data usage accounting information for each mobile subscriber connected to the secondary communications infrastructure.

Each mobile subscriber device may comprise an offload controller that is configured to detect the initiation of a data session on the mobile subscriber device and send an offload request over the primary communication medium to the offload management system that is configured to process the offload request and send an offload request reply to the mobile subscriber device indicative of an approved or denied offload request.

The offload management system may be configured to generate approved offload request replies that comprise login information to enable the mobile subscriber device to connect to the secondary communication medium. The login information of the approved offload request reply may comprise a one time password.

The offload controller of each mobile subscriber device may be configured to establish offloading of its mobile subscriber device from the primary communications medium to the secondary communications medium in response to an approved offload request reply from the offload management system.

The offload controller may be a daemon program or application running on the mobile subscriber device.

In one embodiment, the mobile communications infrastructure may comprise two or more primary communications infrastructures, each providing a primary communications medium.

In another embodiment, the mobile communications infrastructure may comprise two or more secondary communications infrastructures, each providing a primary communications medium.

In one form, the primary communications infrastructure may be a cellular network.

In one form, the secondary communications infrastructure may be a wireless local area network accessible by wireless access points.

Data usage by a mobile subscriber device during a data session over the secondary communications medium may be recorded by the wireless access point to which the mobile subscriber device is connected and data usage information is sent by the wireless access point to the offload management system periodically during a data session or at the end of a data session.

In one form, the data network may be the Internet.

In a second aspect, the present disclosure broadly describes a method of offloading a mobile subscriber device from a primary communications medium to a secondary communications medium during a data session required by an activated application program of the mobile subscriber device, comprising the steps of: (a) receiving an offload request from a mobile subscriber device over the primary communications medium; (b) accessing an offload profile for the mobile subscriber device indicative of whether the mobile subscriber device is allowed to offload to the secondary medium and which is stored in a policy database; (c) accessing the resource status information of the secondary communication medium indicative of the available capacity on the secondary communications medium from a resource database; and (d) replying to the offload request based on the offload profile and resource status information with either an approved offload request reply providing login information to enable the mobile subscriber device to establish a new data channel link over the secondary communications medium for the data session or a denied offload request reply such that the mobile subscriber device continues the data session over a data channel link established over the primary communications medium.

The offload request received may comprise data session information indicative of the type of data session required by the mobile subscriber device and step (d) further comprises replying to the offload request based on that data session information. In one form, the data session information of the offload request may be indicative of the intended data usage by the mobile subscriber device and step (d) comprises replying with an approved offload request reply if the intended data usage exceeds a data volume threshold. In another form, the data session information of the offload request may be indicative of the type of application program being run on the mobile subscriber device that requires the data session and step (d) comprises replying with an approved offload request reply if the type of application program is approved for offloading.

Step (d) may comprise replying with an approved offload request reply if the offload profile of the mobile subscriber device is approved for offload and if the resource status information indicates there is available capacity on the secondary communications medium.

The offload request received may comprise mobile subscriber identification information indicative of the identity of the mobile subscriber device making the offload request.

In one form, the offload request received may comprise access point information indicative of accessible access points for connecting the mobile subscriber device to the secondary communications medium and wherein step (c) comprises accessing resource status information from the resource database in the form of capacity information indicative of the available capacity of the accessible access points.

In another form, the offload request received may comprise location information indicative of the current location of the mobile subscriber device and wherein step (c) comprises accessing resource status information from the resource database in the form of capacity information indicative of the available capacity of access points for connecting to the secondary communications medium that are accessible based on the location of the mobile subscriber device.

In one form, step (d) may further comprise sending an approved offload request reply that further comprises a list of accessible access points for connecting the mobile subscriber device to the secondary medium, the list being ranked for performance according to signal strength relative to the mobile subscriber device.

In another form, step (d) may further comprise sending an approved offload request reply that further comprises a list of accessible access points for connecting the mobile subscriber device to the secondary medium, the list being ranked for performance according to the distance between each access point and the location of the mobile subscriber device.

Step (d) may comprise replying with an approved offload request reply comprising login information in the form of a one time password to enable the mobile subscriber device to establish a connection to an accessible access point of the secondary communications medium.

The method may further comprise authenticating any attempted establishment of a new data channel link over the secondary communications medium by a mobile subscriber device.

In a third aspect, the present disclosure broadly describes an offload management system for controlling the offloading of a mobile subscriber device from a primary communications medium to a secondary communications medium during a data session, the system being configured to perform the steps of the second aspect of the disclosure.

In one form, the primary communications medium may be provided by a cellular network.

In another form, the secondary communications medium may be a wireless local area network accessible by wireless access points.

In a fourth aspect, the present disclosure broadly describes a method of offloading a mobile subscriber device from a primary communications medium to a secondary communications medium during a data session required by an activated application program of the mobile subscriber device, comprising the steps of: (a) detecting initiation of a data session by the mobile subscriber device over a data channel link on the primary communications medium; (b) sending an offload request over primary communications medium to an offload management system upon detection of the data session; (c) receiving an offload request reply from the offload management system, the reply comprising either an approved offload request reply comprising login information for the secondary communications medium or a denied offload request reply; and (d) initiating a new data channel link over the secondary communication medium for the data session based on an approved offload request reply or continuing the data session over the data channel link on the primary communications network for a denied offload request.

Step (a) may comprise detecting the activation of an application program on the mobile subscriber device that requires a data session.

Step (b) may comprise sending an offload request comprising identification information indicative of the identity of the mobile subscriber device.

Step (b) may comprise sending an offload request comprising data session information indicative of the type of data session required by the mobile subscriber device. In one form, the data session information may be indicative of the intended data usage by the mobile subscriber device. In another form, the data session information may be indicative of the type of application program being run on the mobile subscriber device that requires the data session.

In one form, the method may further comprise the step of initiating the mobile subscriber device to scan for accessible access points of the secondary communications medium in range of the mobile subscriber device and wherein step (b) comprises sending an offload request that comprises access point information indicative of the accessible access points for connecting the mobile subscriber device to the secondary communications medium based on the scan.

The access point information may comprise access point identification information indicative of the identity of the accessible access points and signal strength information indicative of the signal strengths of the accessible access points. The access point information may comprise a list of the accessible access points ranked for performance according to signal strength relative to the mobile subscriber device.

In another form, the method may further comprise the step of initiating the mobile subscriber device to detect location information indicative of the location of the mobile subscriber device and wherein step (b) comprises sending an offload request that comprises the location information.

In one form, step (c) may comprise receiving an approved offload request reply from the offload management system that further comprises a list of accessible access points for connecting the mobile subscriber device to the secondary communications medium, the list being ranked for performance according to signal strength relative to the mobile subscriber device, and wherein step (d) comprises sequentially attempting to initiate a connection to an access point on the list in order of highest ranking until a successful connection is established for the new data channel link over the secondary communication medium for an approved offload request reply.

In another form, step (c) may comprise receiving an approved offload request reply from the offload management system that further comprises a list of accessible access points for connecting the mobile subscriber device to the secondary communications medium, the list being ranked for performance according to the distance between each access point and the location of the mobile subscriber device, and wherein step (d) comprises sequentially attempting to initiate a connection to an access point on the list in order of highest ranking until a successful connection is established for the new data channel link over the secondary communication medium for an approved offload request reply.

In a fifth aspect, the present disclosure broadly describes an offload controller on a mobile subscriber device for controlling the offloading of the mobile subscriber device from a primary communications medium to a secondary communications medium during a data session, the controller being configured to perform the steps of the above fourth aspect.

In one form, the controller may be in the form of a daemon program running on the mobile subscriber device.

In one form, the primary communications medium may be provided by a cellular network.

In another form, the secondary communications medium may be a wireless local area network accessible by wireless access points.

Any one of the above first-fifth aspects may have any one or more of the features mentioned in respect of the other aspects above.

Further areas of applicability will become apparent from the description provided herein. The description and specific examples in this summary are intended for purposes of illustration only and are not intended to limit the scope of the present disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

As used herein the term "and/or" means "and" or "or", or both.

As used herein "(s)" following a noun means the plural and/or singular forms of the noun.

BRIEF DESCRIPTION OF THE DRAWINGS

Example embodiments of the disclosure will be described by way of example only and with reference to the drawings, in which.

DETAILED DESCRIPTION

Overview

The present disclosure relates to a mobile communications infrastructure for providing automatic data offloading of mobile subscriber devices (MSD) from a primary communications medium to a secondary communication medium when a user of the MSD is operating an application program that requires a data session, for example a data channel link to the Internet.

Example embodiments will now be described more fully with reference to the accompanying drawings.

Figure 1:
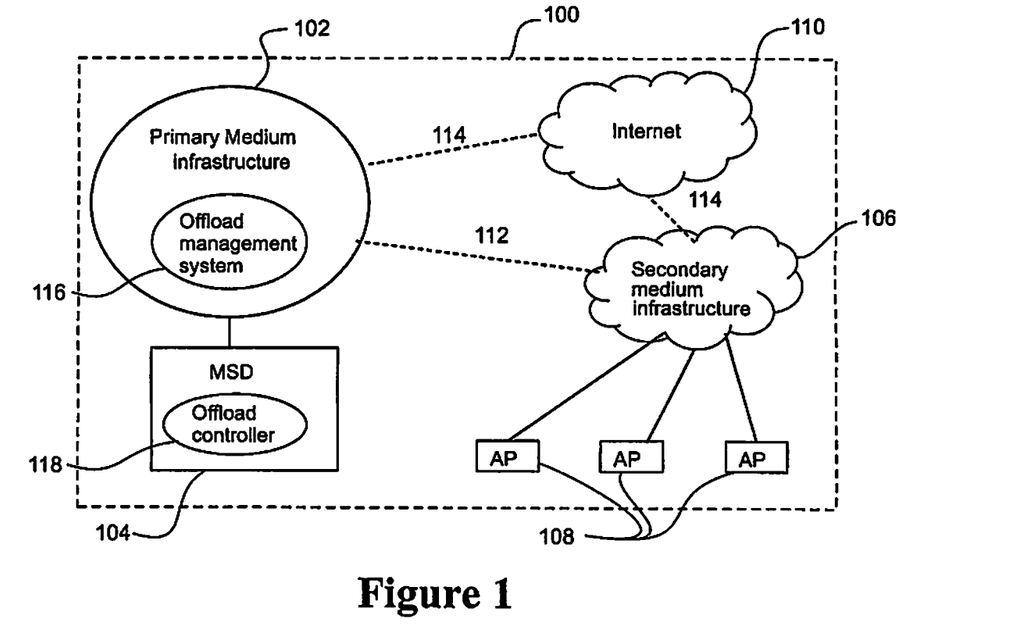
FIG. 1 shows a schematic diagram of a mobile communication infrastructure with primary and secondary communication mediums and an offload management system in the primary communications infrastructure in accordance with a first embodiment of the disclosure.

Referring to FIG. 1, a first embodiment of the mobile communications infrastructure 100 is shown. The mobile communications infrastructure 100 comprises one or more primary communications infrastructures that provide a primary communication medium 102. The primary communications infrastructure is typically a cellular network, such as 2.5G or 3G cellular network or any other cellular network communication standard. The primary communications infrastructure has subscribers that access the cellular network via a MSD 104 (only one shown), such as, but not limited to, mobile phone, smart phone, Personal Digital Assistant (PDA), or any other portable communications device capable of wireless communication over the cellular channel as will be appreciated. The mobile communications infrastructure 100 also comprises at least one secondary communication infrastructure 106 that provides a secondary communication medium being a different type to the primary communications. By way of example, the secondary communication infrastructure may be in the form of a wireless local area network (WLAN) accessible via one or more wireless access points (AP) 108, such as but not limited to Wi-Fi APs.

In this mobile communication infrastructure 100, the MSDs 104 have hardware circuitry configured to enable communication over both the primary 102 and secondary 106 communication mediums or channels, as will be appreciated. For example, each mobile communication device may have a cellular transceiver for communicating over the cellular channel and a Wi-Fi communications module for communicating over the secondary Wi-Fi channel to access the WLAN 106. It will be appreciated that the mobile communications infrastructure is not limited to a primary communications infrastructure in the form of cellular network and a secondary communication infrastructure in the form of a WLAN, and that other suitable wireless communication mediums and networks may alternatively be used if desired.

As shown, the primary 102 and secondary 106 communications infrastructures of the mobile communications infrastructure 100 have an access or connection to a data network such as the Internet 110, although it will be appreciated that the primary and secondary communication mediums may facilitate connection to any other private or public data network, server or database, whether via the Internet or direct connection. Additionally, in this first embodiment the primary 102 and secondary 106 communication infrastructures may either have a direct communication link 112 or an indirect communication link 114 via the Internet 110 or any other intermediate communication network.

The mobile communications infrastructure 100 is configured to provide improved quality of service (QoS) for subscribers using their mobile subscriber devices 104 for data sessions. For example, the mobile communications infrastructure 100 comprises an offload management system 116 that is configured to cooperate with an offload controller 118 provided on each MSD 104 to automatically offload a MSD from the primary cellular network 102 (primary communications medium) to a secondary WLAN 106 (secondary communication medium) where doing so will maintain or improve the QoS of a data session being run by the subscriber. In this embodiment, the offload management system is integrated with or operated by the operator of the primary communications infrastructure 102. When the subscriber initiates an application program on their MSD 104, such as an email application, internet browsing, video-chat or any other application program requiring data from a data network, an initial data channel link to the data network is created over the cellular network 102. Upon initiation of the data session, the offload controller 118 of the MSD communicates with the offload management system 116 to determine whether the MSD should create a new data channel link to the data network for the data session over the Wi-Fi medium of the WLAN 106, if one is in range. The determination of whether the MSD should be offloaded to the WLAN 106 depends on a number of variables as will be explained further below, but typically an offload will generally only be initiated if this is likely to provide the optimal data channel link for the user's data session.

Figure 2:
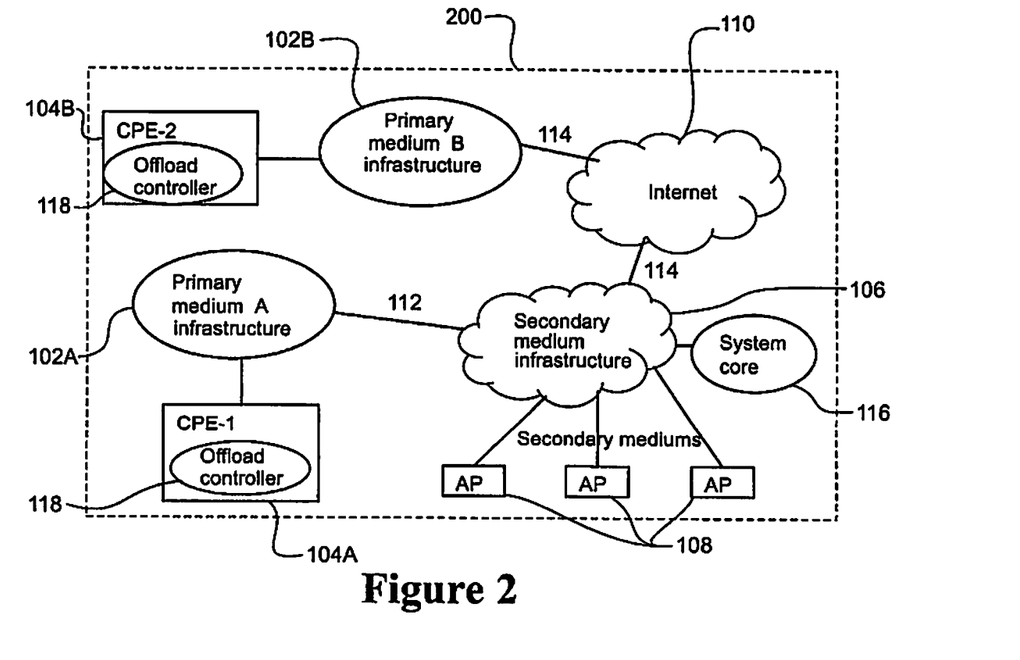
FIG. 2 shows a schematic diagram of a mobile communications infrastructure having multiple primary communications mediums and a secondary communication medium with an offload management system provided in the secondary communication medium infrastructure in accordance with a second embodiment of the disclosure.

FIG. 2 shows second embodiment of the mobile communications infrastructure 200 in which there are two primary communications infrastructures 102A, 102B, each being run by separate operators and having their own subscribers with respective MSDs 104A, 104B and where the offload management system is integrated or operated by the operator of the secondary communications infrastructure 106. In this embodiment, the primary communications infrastructure 102A is directly connected via communication link 112 to the secondary communications infrastructure 106 while the other primary communications infrastructure 102b is indirectly connected by communication link 114 via the Internet 110.

It will be appreciated that the mobile communications infrastructures may include one or more primary communications infrastructures and one or more secondary communications infrastructures and that the offload management system may be part of the primary communications infrastructure, secondary communications infrastructure, dispersed amongst the primary and secondary communications infrastructures, standalone or a combination of these.

The main system components of the mobile communications infrastructure and their functionality, and typical system operation, will now be explained in further detail below with reference to FIGS. 3-5.

Offload Management System

The offload management system 116 is provided with three main components or modules for carrying out three primary functions. The offload management system comprises a policy server 120, a resource server 122, and an authentication, authorisation and accounting server 124. The servers 120, 122, 124 of the offload management system may be provided on separate or the same computer system or configurable hardware device. Any one or more of the servers 120, 122, 124 may reside in the primary 102 or secondary 106 communication infrastructures, or may standalone, for example third party operated, and communicate with those infrastructures as depicted in FIG. 3. Additionally, the servers 120, 122, 124 may be separate application programs or a single application program that is programmed or coded to perform the three server functions. It will be appreciated that the three server functions may be implemented and configured in various ways to provide communication and data transfer between the servers. Each server will be described in further detail below.

Policy Server

The policy server 120 comprises information on the subscribers and their MSDs 104 in the cellular network 102. Additionally, each MSD 104 has an offload profile that determines whether the MSD qualifies or is allowed to offload to the WLAN 106. The offload profile may be configured based on the subscriber's data plan, including whether they are a pre-pay customer or post-pay customer. The offload profiles of the subscribers are stored in a policy database of or accessible by the policy server. The policy database information is maintained and updated by the primary or secondary infrastructure operators.

In embodiments where the policy server is located at and operated by a third party to the operators of the primary or secondary infrastructures, the policy server in one form may have an accessible local policy database that is a minor image or duplicate real-time copy of a policy database maintained by the primary or secondary infrastructure operators. The synchronisation of the respective policy databases at the primary or secondary infrastructures and third party operator may be performed over a data link. In other forms, the policy server run by the third party operator need not operate its own policy database and may access the policy database of the primary or secondary infrastructure over a data link or may alternatively be configured to send enquiry requests for policy database information, for example offload profiles, over a data link to the primary or secondary infrastructure operators as required. It will be appreciated that the policy database of the primary or secondary infrastructure operators need not necessarily be a separate database and may be part of or integrated with an existing primary or secondary medium subscriber database. For example, the subscriber database may be expanded or configured to additionally store policy database information such as offload profile information for each subscriber.

In embodiments where the policy server is located at and operated by either the primary or secondary infrastructures, the policy server may access a local policy database for the subscriber offload profiles or alternatively this policy database information may be accessed from the existing primary or secondary medium subscriber database as discussed above.

The offload profile for each subscriber may be dynamically modified by the operator of the offload management system at any time to control the offload capability of certain individual subscribers or groups of subscribers. For example, offload priority may be given to pre-pay users over post-pay users, vice versa, or based on their subscription packages.

The policy server is also configured to make decisions on whether each MSD 104 should be offloaded based on the type of application program being run on the MSD or type of data session required and about which, if any, is the best AP 108 to connect to on the WLAN 106 based on signal strength and capacity. Capacity or traffic volume on each of the APs 108 are tracked by the resource server 122 and provided to the policy server 120 in the form of resource status information. Ultimately, the policy server 120 is configured to assign an AP 108 to the MSD that provides the optimal QoS, assuming offload is allowed based on the offload profile and offload is necessary given the type of data session required (e.g. streaming multimedia or video-chat). In situations where the policy server 120 determines there are no accessible APs 108 with good enough signal strength and/or capacity, it will respond to the MSD 104 seeking offload with instructions to maintains its current data channel link over the cellular network 102 for the remainder of the data session or until a useful AP 108 becomes available for the Wi-Fi medium 106 to access the WLAN.

Resource Server

The resource server 122 is configured to track the status of the APs 108 of the WLAN 106. For example, the resource server 122 is configured to track in real-time the number of MSDs 104 connected to each AP 108, traffic condition or capacity, and overall status of the APs. In some embodiments, the resource server 122 may also store location information and connection range information for each AP in the WLAN infrastructure and this may be used in some configurations to determine the accessible APs available to a MSD 104 seeking an offload.

AAA Server

The AAA server 124 is configured as the authentication, authorisation and accounting server for the secondary communications infrastructure 106. The AAA server 124 handles the authentication requests from APs 108 in the WLAN 106 when being connected to by an offloaded MSD 104. The AAA server 124 also handles authorisation of the MSDs 104 for access to a data network such as the Internet 110 over the WLAN 106 and stores accounting information on the data usage through the AP by the MSD during their data session. In this embodiment, the data usage information is stored by the APs 104 during the data session and is either periodically sent to the AAA server 124 for storing in a AAA database or sent to the AAA server for storing at the end of the data session or when a connection is lost. The AAA server 124 also updates the resource server 122 on new MSD connections to the APs 108 in the WLAN 106.

Offload Controller

As previously discussed, each MSD 104 in the mobile communications infrastructure has an offload controller 118. In this embodiment, the offload controller 118 is in the form of a daemon program running in the background, rather than under the direct control of the user. However, alternatively the offload controller may be an application program. The offload controller is configured to detect when the user is running an application on the MSD that requires a data channel link to a data network such as the Internet. Upon detecting a data session, the offload controller 118 sends an offload request to the offload management system 116 over the cellular network 102. While the offload request is being processed, the user continues their data session over the cellular network, awaiting a reply. If the offload controller receives an approved offload request from the offload management system, it is then configured to establish or set up a connection for MSD with an AP 108 based on access information provided by the offload management system 116. Once the MSD is connected to an AP 108, a new data channel link is created for continuing the data session over the Wi-Fi medium 106 of the WLAN. If the offload controller receives declined offload request, the MSD 104 maintains its data channel link over the cellular network 102 for the data session.

Access Points

The access points (APs) 108 or base stations provide wireless access to the WLAN infrastructure 106. The mobile communications infrastructure may have one or multiple secondary communications infrastructures or WLANs for example and each secondary communications infrastructure may have its own set of one or more APs. The APs 108 are configured to provide accounting information on MSD data usage to the AAA server 124. In this embodiment, user data from the Internet 1110 is not routed via the AAA server 124 for accounting purposes. Rather, all user data is sent directly to MSD from the internet service provider (ISP) or internet gateway of the secondary WLAN infrastructure.

System Operation

Figure 3:
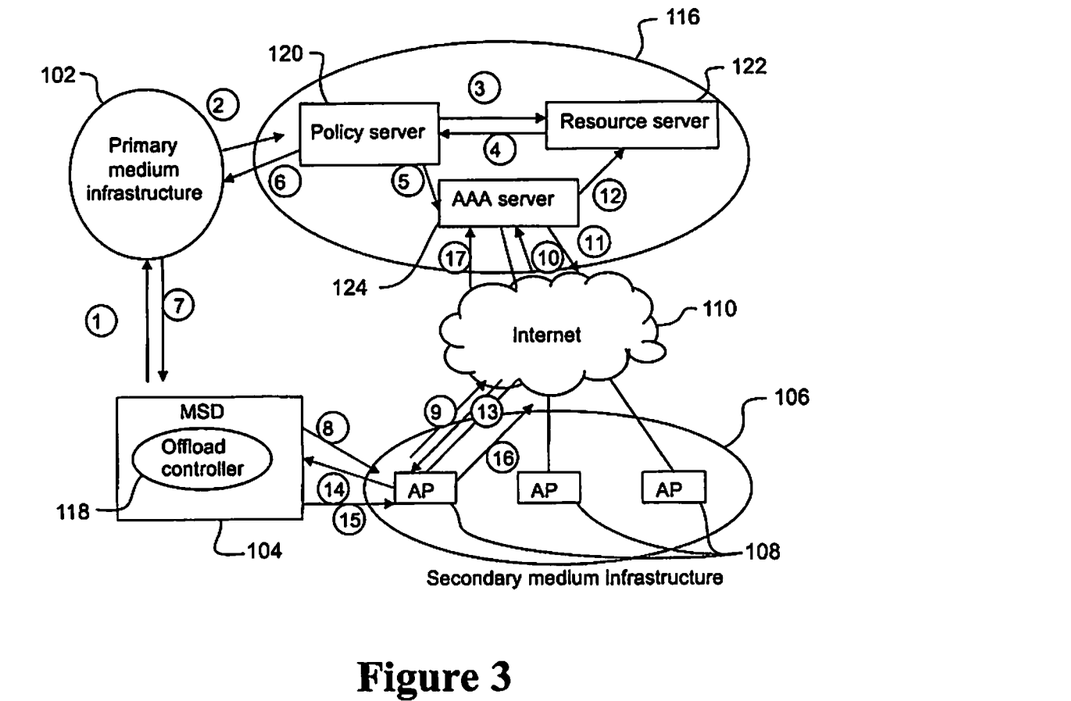
FIG. 3 shows a schematic diagram of the offload protocol sequence in accordance with an embodiment of the disclosure.
Figure 4:
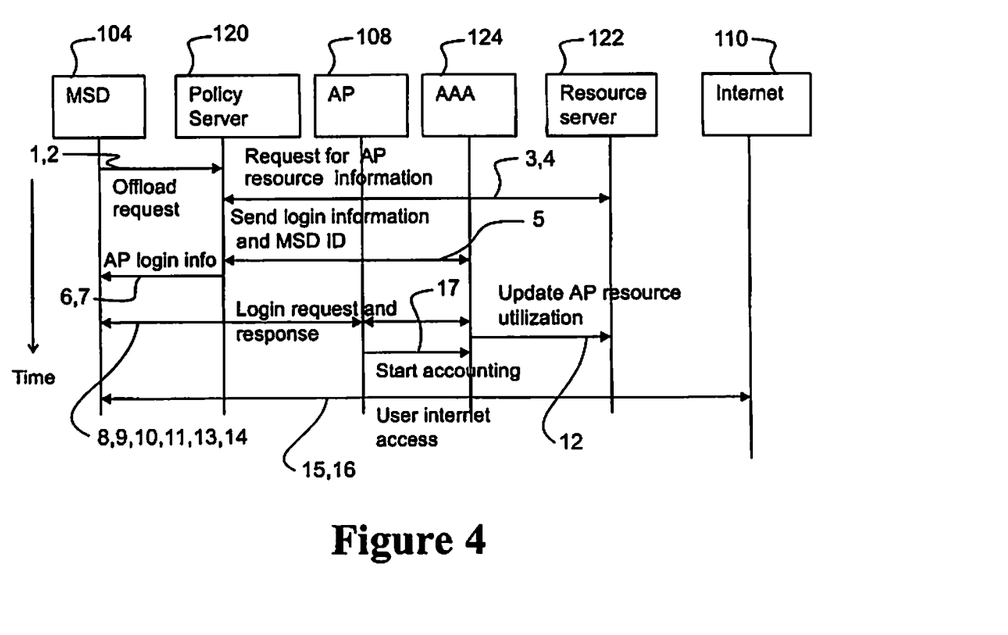
FIG. 4 shows a schematic diagram of the data flow during the offload protocol sequence of FIG. 3 in accordance with an embodiment of the disclosure.
Figure 5:
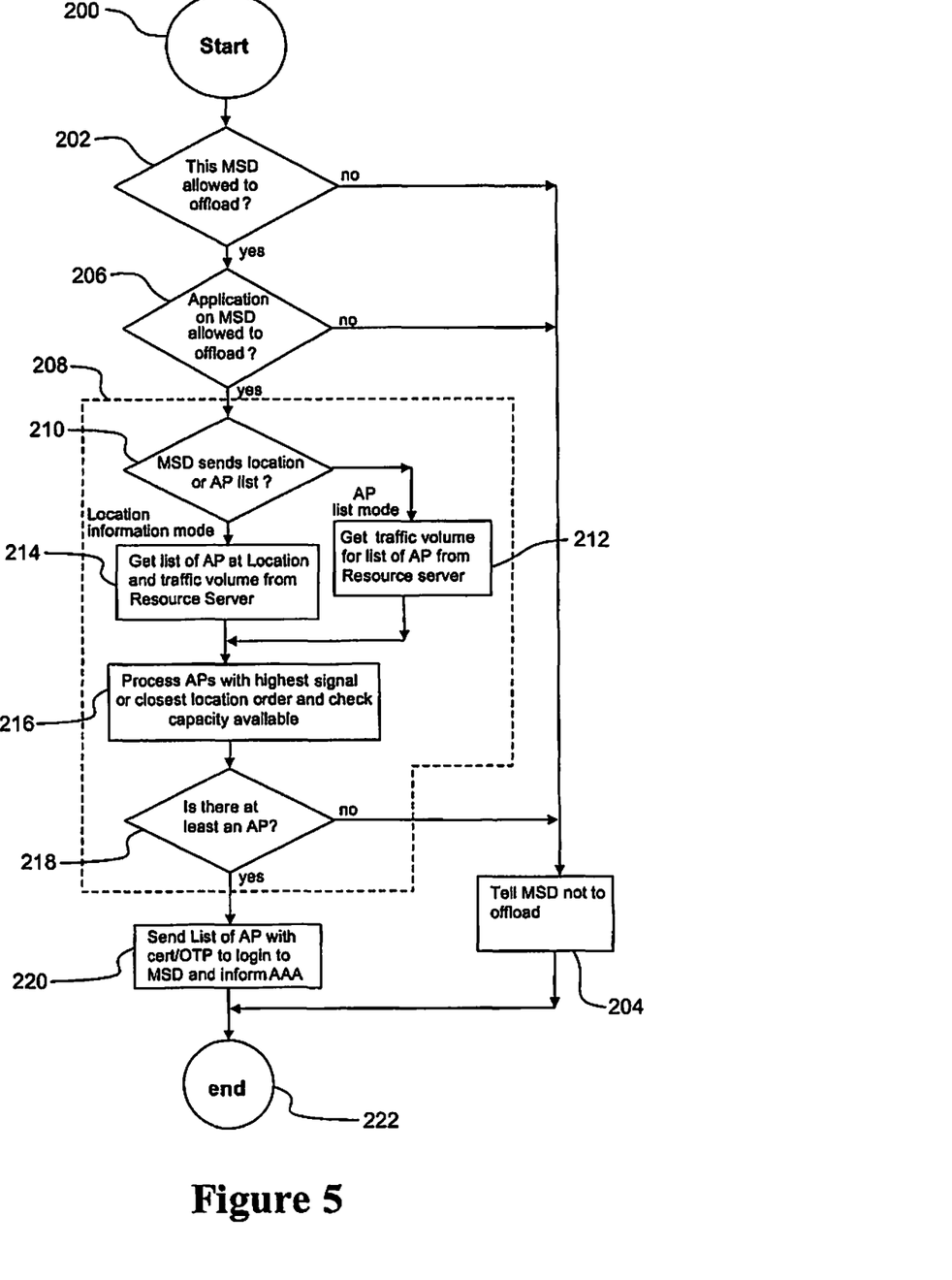
FIG. 5 shows a flow diagram of the offload request processing performed by the offload management system in accordance with an embodiment of the disclosure.

With reference to FIGS. 3-5, the general system operation will now be described by way of example, and in particular the offloading protocol sequence.

When a subscriber initiates a data session on their MSD 104 by using an application program requiring data, such as internet browsing, accessing email, multimedia streaming of audio and/or video or any other application program requiring data from a data network such as the Internet, the offload controller 118 onboard the MSD 104 monitors and detects the use of such application programs or the initiation of a data session. In one embodiment, the offload controller 118 then operates the MSD 104 to scan for accessible APs 108 of the secondary WLAN infrastructure 106 that are in range and generates an access point list (AP list), which may include AP identification information such as the service set identifier (SSID) and also signal strength information. The AP list may be ranked in order of the best signal strength. The offload controller then sends an offload request to the policy server 120 of the offload management system 116 over the cellular network 102 as shown at 1 and 2 in FIGS. 3 and 4. The offload request includes MSD identification information, for example SIM card information or other subscriber ID information, the AP list, and data session information indicative of the actual or type of application program the user is operating or level of data usage required by the MSD for the data session. In an alternative embodiment, the offload controller 118 may dispense with scanning for accessible APs 108, and may simply send location information indicative of the current location of the MSD 104 in the offload request rather than the AP list. Based on that location information, the offload management system 116 may determine accessible APs in the vicinity of the MSD 104 based on stored AP location information in the resource server 122. It will be appreciated that the location information of the MSD may be generated by a location module of the MSD based on cell-location, GPS or the like.

The policy server 120 of the offload management system 116 receives the offload request from the MSD 104. The policy server 120 then initiates offload request processing to determine whether the offload request should be approved so that the MSD can access a WLAN 106 over the Wi-Fi medium to re-establish the data session or declined so that the MSD is not offloaded and is required to maintains its data channel link for the data session over the cellular network 102. An example of the offload request processing by the policy server 120 will now be described in further detail with reference to FIGS. 3-5.

With reference to FIG. 5, the offload request processing starts at 200 when the offload request is received from the MSD 104. As explained above, the offload request received from the MSD includes various data, including MSD ID information, data session information, and AP list information or alternatively location information. At step 202 in the processing, the policy server 120 is configured to access or retrieve the offload profile associated with the subscriber of the MSD 104 making the offload request based on the MSD ID information. The offload profile for each subscriber may be stored in a policy database of or accessible by the policy server. Each subscriber offload profile contains information on whether offloading to a WLAN 106 is allowed for the subscriber, and this may be based on the subscriber's subscription or data plan, or other cellular network operating factors for example. Each subscribers offload profile may be dynamically updated by the operator. If offloading is not allowed, the policy server sends an offload request reply to the MSD 104 denying the offload request as shown at step 204 such that the MSD maintains its data channel link over the cellular network 102 for the data session.

If offloading is allowed, the policy server 120 then determines at step 206 whether the application program or data usage required for the data session would benefit from being offloaded to the WLAN 106 based on the data session information. The policy server may comprise a list of application programs or type of programs and whether each program or type requires offloading or not based on expected data usage. For example, an application program on the MSD that requires low data volume or very short bursts of data may not warrant offloading, whereas higher data volume usage programs may benefit from offloading to the WLAN 106, such as multimedia streaming applications, video-chat, internet browsing and the like. Alternatively or additionally, the policy server may be configured with data volume thresholds that dictate whether the intended data usage by the application program should be offloaded or maintained on the cellular network. At step 204, the policy server 120 is configured to make a decision on offloading based on the data session information (application type or intended data usage) provided in the offload request based on preconfigured data session offload criteria or settings as discussed above. If the offload criteria for the data session are not met, the policy server sends an offload request denial to the MSD 104 as shown at step 204. If the data session offload criteria are met, the processing procedure moves to the next step of assessing whether there are any suitable APs 108 for connecting to the WLAN 106 to create a new data channel link for the subscriber's data session, and this involves a resource assessment 208 of the WLAN as will be described next.

The resource assessment 208 has two modes depending on the nature of the offload request received sent by the MSD 104. The policy server at step 210 determines whether the offload request includes an AP list indicative of scanned accessible APs 108 in the vicinity of the MSD CAP list mode') or alternatively location information relating to the MSD's location (location information mode').

When in the AP list mode 212, the policy server sends a resource status request to the resource server 122 as shown at 3 in FIGS. 3 and 4. The resource status request provides the AP list and requests information on the capacity available at those APs 108 to accept new connections from MSDs. The resource server 122 is configured to retrieve the capacity information from its resource database regarding the received list of APs and send a resource status request reply with the AP list and capacity information. In this embodiment, the resource status request reply generated by the resource server is show at 4 in FIGS. 3 and 4. As previously described, the resource server 122 maintains capacity information relating to all the APs 108 in the WLAN 106.

Alternatively, when in the location information mode 214, the policy server 120 is configured to send a resource status request to the resource server 122 with the location information provided by the MSD. Based on the location information, the resource server 122 is configured to determine accessible APs within range of the MSD based on AP location and range information stored in the resource server or an associated resource database. The resource server 122 is configured to compile an AP list of the accessible access points in the MSD's location and then access the capacity information for each of those APs from the resource database. As with the AP list mode, the resource server then generates and sends a resource status request reply containing the generated AP list with the associated capacity information.

Upon receiving the resource status request reply at 4 shown in FIGS. 3 and 4, the policy server processes the AP list and capacity information into ranked order of the best to worst APs and generates a ranked AP list. If the resource assessment 208 is running in location information mode, the AP list is ranked from closest to furtherest in location from the MSD, and any APs having no capacity are omitted based on the capacity information. If running in AP list mode, the policy server sorts the AP list from highest to lowest in signal strength as detected by the MSD in the initial scan and omits any APs having no capacity based on the capacity information.

The resource assessment then determines at step 218 whether there is at least one accessible AP in the ranked AP list that has sufficient signal strength or proximity to the MSD and with available capacity. If there is no suitable AP on the ranked AP list, then the policy server generates a denied offload request reply at 204. If there is at least one suitable AP on the ranked AP list, the policy server 120 is configured to generate login information, such as a token or one-time password (OTP) or certificate to enable the MSD to login into the APs on the ranked AP list. The policy server 120 is then configured to send the AAA server 124 information indicative of an authorised offload request. The authorised offload request includes the MSD ID information and login information so that the AAA server 124 can authorise the MSD's login and this information transfer is shown at 5 in FIGS. 3 and 4.

To conclude the offload request processing, the policy server then sends an approved offload request reply shown at 6 in FIGS. 3 and 4 comprising the ranked AP list and login information. The offload request reply is sent over the cellular network 102 to the MSD 104. This is shown at 6 and 7 in FIGS. 3 and 4 and step 220 in FIG. 5, which ends the offload request processing by the policy server at 222.

Upon receipt of an approved offload request reply, the offload controller 118 of the MSD 104 controls the MSD to initiate a connection to the AP or the first ranked AP in the ranked AP list using the login information. If the login attempt to the AP fails, the offload controller then initiates a login with the next highest ranked AP on the ranked AP list until a connection to the WLAN 106 over the Wi-Fi medium is made. If no connection is established, the MSD maintains its data channel link over the cellular network 102 for the data session, i.e. there is no offloading. Referring to FIGS. 3 and 4, upon receiving a login request 8, the first ranked AP 108 sends the login request to the AAA server 124 in this case over the WLAN via the Internet 110 as shown at 9 and 10. The AAA server 124 is configured to check the login request for authentication and authorisation of the MSD to login to the AP based on previous information provided by the policy server at 5 as explained above. The AAA server 124 checks its database and, if appropriate, authorises the MSD to login by sending a login request reply to the AP as shown at 11 and 13. The AAA server 124 also sends the resource server 122 an update as shown at 12 indicative of a new connection to the AP so that the capacity information can be updated in the resource database. In response to an approved login request reply 13, the AP completes the set up connection of the MSD by responding as shown at 14. Once the set up is complete, the MSD opens a new data channel link as shown by 15 and 16 to a database, such as the Internet 110, over the Wi-Fi medium and then the offload controller switches the data session to the new data channel link. As will be appreciated above, no user interaction is required to handle the offloading to the WLAN 106. The offloading process occurs automatically to the user.

As previously indicated, the AP 108 tracks data usage by the MSD 104 and updates the AAA server with data usage either periodically or at the end of the data session as shown at 17. In this embodiment, the MSD's data utilisation counting is handled by the APs and data traffic is not routed through the AAA server for counting.

In this embodiment, the offload controller 118 will not undertake the above offload procedure if a connection to the WLAN is already active. For example, if a new application program is initiated on the MSD by the subscriber requiring data, the existing data channel link over the WLAN 106 will be used rather than establishing a new data channel link over the cellular network 102.

The MSD may disconnect from the WLAN 106 and revert to the cellular network for the data session for a number of reasons. If the data channel link on the WLAN 106 is not used for a long period, the operating system or firmware of the MSD 104 may shutdown the connection to the WLAN to conserve power and this may be a default setting in the MSD. Alternatively, the MSD user may manually disconnect from the WLAN at the end of a data session. In these situations, the offload controller 118 will not try and reinitiate another offload back to the WLAN unless there is a new data session initiated. In the case of disconnection from the AP of the WLAN due to signal loss or moving out of range of the AP, the firmware or operating system of the MSD will automatically switch back to the cellular network 102 for the data session. In such cases where the data session continues, the offload controller 118 will try and reinitiate the offload process to another AP in the WLAN by repeating the same offloading procedure described above.

Other Mobile Infrastructure Embodiments

As previously explained, the mobile communications infrastructure described above may be varied to include one or more primary communications infrastructures and one or more secondary communication infrastructures. Additionally, the offload management system or its functionality may be spread amongst the primary and/or secondary infrastructures and where multiple secondary communications infrastructures exist, each may have respective offload management system functionality.

Figure 6:
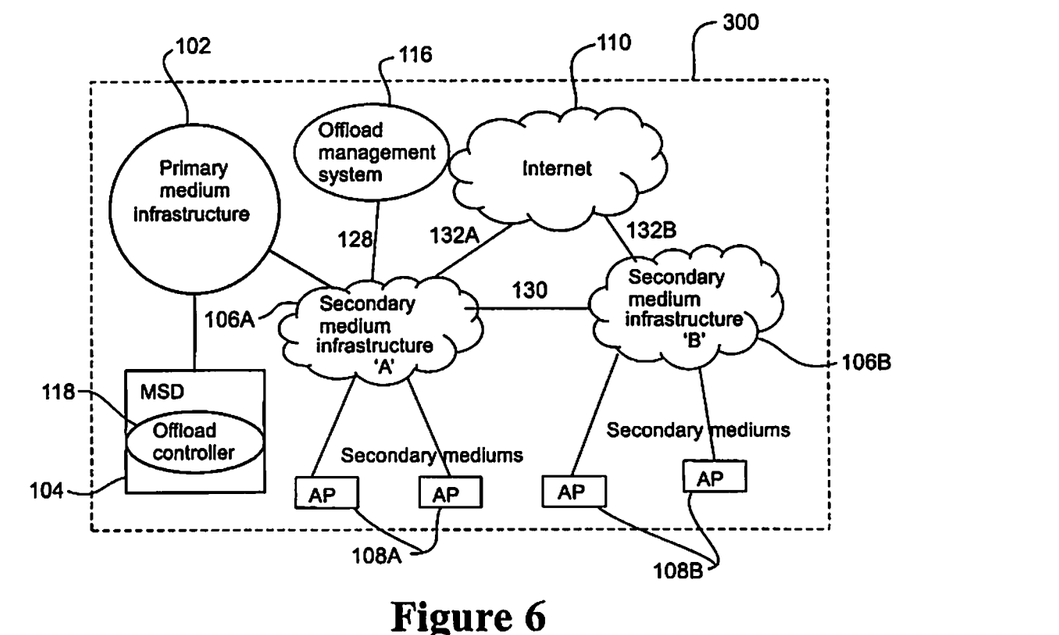
FIG. 6 shows a schematic diagram of a mobile communications infrastructure having a primary communication medium and multiple secondary communication mediums with a single offload management system in accordance with a third embodiment of the disclosure.

Referring to FIG. 6, a third embodiment of the mobile communications infrastructure 300 is shown in which there is a single primary communications infrastructure 102 and two secondary communications infrastructures 106A and 106B. A single offload management system 116 is configured to control the offload of the MSDs 104 from the primary communications infrastructure to either of the secondary communication infrastructures 106A, 106B via their respective access points 108A, 108B. As shown, there is a communication link 130 between the secondary communications infrastructures 106A, 106B and each of their respective connections to the database, such as the Internet 110, are shown at 132A and 132B respectively. As with the previous embodiments described, the access points 108A, 108B route Internet traffic via their respective Internet gateways directly and data usage is accounted for at the access point level. The AAA server functionality of the offload management system 116 receives the data usage and accounting information periodically or at the end of a session from the access points via its direct 128 or indirect 130 communication links to the offload management system 116.

Figure 7:
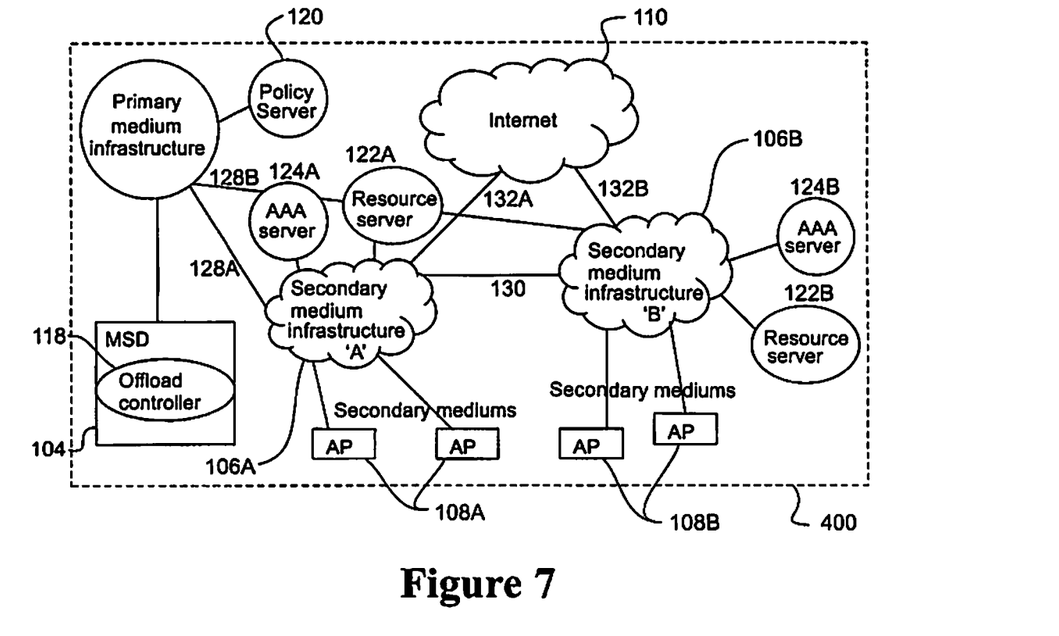
FIG. 7 shows a schematic diagram of a mobile communications infrastructure having a primary communication medium and multiple secondary communication mediums with the offload management system functionality being spread between the primary and secondary communications infrastructures in accordance with a fourth embodiment of the disclosure.

Referring to FIG. 7, a fourth embodiment of the mobile communications infrastructure 400 is shown which is a modification of the embodiment of FIG. 6. In this embodiment, the secondary communications infrastructures 106A, 106B maintain their own respective AAA servers 124a, 124b and resource servers 122a, 122b. There is a single policy server 110 at the primary communications infrastructure 102 which has communication links to the secondary communications infrastructures 106A, 106B via communication links 128A, 128B. This embodiment shows that the functionality of the offload management system may be spread amongst the primary and secondary communications infrastructures.

In all other respects the functionality of the offload request processing for the third and fourth embodiments is fundamentally the same as that previously described except that the data flows are routed via different or additional communication links.

Summary

The mobile communication infrastructure described above provides for automatic data offloading of a mobile subscriber device from a primary communications infrastructure, such as a cellular network, to a secondary communications infrastructure such as a WLAN accessible via Wi-Fi during a data session on the MSD. The offload management system is intelligent in that it controls the offloading based on a subscriber offload profile. Additionally, the offload management system is intelligent in that it is configurable to balance the load between the cellular network and WLAN and on the WLAN by approving new connections to APs based on capacity information so as to avoid overloading of the APs of the WLAN. The offloading is handled automatically in the background without requiring user interaction.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A mobile communications infrastructure with coordinated data session offloading of mobile subscriber devices from a primary communication medium for mobile subscriber devices to a secondary communication medium that is accessible by mobile subscriber devices, comprising:
 a primary communications infrastructure which provides the primary communication medium for;
 a secondary communications infrastructure which provides the secondary communication medium, said secondary communication medium having a different connectivity protocol from the primary communication medium; and
 an offload management system configured to control offload of mobile subscriber devices from the primary communication medium to the secondary communication medium during a data session with a data network based on an offload profile associated with the mobile subscriber device and resource status information relating to the available capacity of the secondary communication medium, wherein said offload profile comprises information indicative of whether the mobile subscriber device is approved for offloading;
 wherein, during said data session, a policy server of said offload management system is configured to determine whether to offload said mobile subscriber device and data to said secondary communication medium.

2. The mobile communications infrastructure according to claim 1 wherein the offload management system comprises the policy server and a policy database that stores an offload profile for each mobile subscriber device, each offload profile comprising information indicative of whether the mobile subscriber device is approved for offloading.

3. The mobile communications infrastructure according to claim 1 wherein said offload management system comprises a resource server that is configured to maintain and provide resource status information indicative of the available capacity on the secondary communications infrastructure.

4. The mobile communications infrastructure according to claim 3 wherein a determination of the presence of the best accessible access point is based on information stored in said resource server.

5. The mobile communications infrastructure according to claim 1 wherein the offloading management system comprises an authentication, authorization and accounting server configured to authenticate and authorize new connections to the secondary communication medium by offloading mobile subscriber devices and to receive data usage accounting information for each mobile subscriber connected to the secondary communications infrastructure.

6. The mobile communications infrastructure according to claim 1 wherein each mobile subscriber device comprises an offload controller that is configured to detect the initiation of a data session on the mobile subscriber device and send an offload request over the primary communication medium to the offload management system that is configured to process the offload request and send an offload request reply to the mobile subscriber device indicative of an approved or denied offload request.

7. The mobile communications infrastructure according to claim 6 wherein the offload management system is configured to generate approved offload request replies that comprise login information to enable the mobile subscriber device to connect to the secondary communication medium.

8. The mobile communications infrastructure according to claim 7 wherein the login information of the approved offload request reply comprises a one time password.

9. The mobile communications infrastructure according to claim 6 wherein the offload controller of each mobile subscriber device is configured to establish offloading of its mobile subscriber device from the primary communication medium to the secondary communication medium in response to an approved offload request reply from the offload management system.

10. The mobile communications infrastructure according to claim 6 wherein the offload controller is a daemon program or application running on the mobile subscriber device.

11. The mobile communications infrastructure according to claim 1 comprising two or more of said primary communications infrastructures, each providing the primary communication medium.

12. The mobile communications infrastructure according to claim 1 comprising two or more of said secondary communications infrastructures, each providing the secondary communication medium.

13. The mobile communications infrastructure according to claim 1 wherein the primary communications infrastructure is a cellular network.

14. The mobile communications infrastructure according to claim 1 wherein the secondary communications infrastructure is a wireless local area network accessible by wireless access points.

15. The mobile communications infrastructure according to claim 14 wherein data usage by a mobile subscriber device during said data session over the secondary communication medium is recorded by the wireless access point to which the mobile subscriber device is connected and data usage information is sent by the wireless access point to the offload management system periodically during said data session or at the end of said data session.

16. The mobile communications infrastructure according to claim 1 wherein the data network is the Internet.

17. The mobile communications infrastructure according to claim 1, wherein said policy server of said offload management system is further configured to determine a presence of the best accessible access point for said secondary communication medium in a vicinity of the mobile subscriber device based on signal strength and capacity.

18. The mobile communications infrastructure according to claim 1 wherein said determination to offload said mobile subscriber device is based on a type of application program run on the mobile subscriber device, a type of data session required, or a best available access point.

19. A method of offloading a mobile subscriber device from a primary communication medium to a secondary communication medium during a data session required by an activated application program of the mobile subscriber device, comprising the steps of:
 (a) receiving, by an offload management system, an offload request from a mobile subscriber device over the primary communication medium;
 (b) accessing an offload profile for the mobile subscriber device indicative of whether the mobile subscriber device is allowed to offload to the secondary communication medium and which is stored in a policy database, wherein said offload profile comprises information indicative of whether the mobile subscriber device is approved for offloading;

(c) accessing the resource status information of the secondary communication medium indicative of the available capacity on the secondary communication medium from a resource database, said secondary communication medium having a different connectivity protocol from said primary communications medium;

(d) determining, by a policy server of said offload management system, whether to offload said mobile subscriber device and data to the secondary communication medium; and (e) replying to the offload request based on the offload profile and resource status information with either an approved offload request reply providing login information to enable the mobile subscriber device to establish a new data channel link over the secondary communication medium for the data session or a denied offload request reply such that the mobile subscriber device continues the data session over a data channel link established over the primary communication medium.

20. The method of offloading according to claim 19 wherein the offload request received comprises data session information indicative of the type of data session required by the mobile subscriber device and step (e) further comprises replying to the offload request based on that data session information.

21. The method of offloading according to claim 20 wherein the data session information of the offload request is indicative of the intended data usage by the mobile subscriber device and step (e) comprises replying with an approved offload request reply if the intended data usage exceeds a data volume threshold.

22. The method of offloading according to claim 20 wherein the data session information of the offload request is indicative of the type of application program being run on the mobile subscriber device that requires the data session and step (e) comprises replying with an approved offload request reply if the type of application program is approved for offloading.

23. The method of offloading according to claim 19 wherein step (e) comprises replying with an approved offload request reply if the offload profile of the mobile subscriber device is approved for offload and if the resource status information indicates there is available capacity on the secondary communication medium.

24. The method of offloading according to claim 19 wherein the offload request received comprises mobile subscriber identification information indicative of the identity of the mobile subscriber device making the offload request.

25. The method of offloading according to claim 19 wherein the offload request received comprises access point information indicative of accessible access points for connecting the mobile subscriber device to the secondary communication medium and wherein step (c) comprises accessing resource status information from the resource database in the form of capacity information indicative of the available capacity of the accessible access points.

26. The method of offloading according to claim 19 wherein the offload request received comprises location information indicative of the current location of the mobile subscriber device and wherein step (c) comprises accessing resource status information from the resource database in the form of capacity information indicative of the available capacity of access points for connecting to the secondary communication medium that are accessible based on the location of the mobile subscriber device.

27. The method of offloading according to claim 19 wherein step (e) further comprises sending an approved offload request reply that further comprises a list of accessible access points for connecting the mobile subscriber device to the secondary communication medium, the list being ranked for performance according to signal strength relative to the mobile sub scriber device.

28. The method of offloading according to claim 19 wherein step (e) further comprises sending an approved offload request reply that further comprises a list of accessible access points for connecting the mobile subscriber device to the secondary communication medium, the list being ranked for performance according to the distance between each access point and the location of the mobile subscriber device.

29. The method of offloading according to claim 19 wherein step (e) comprises replying with an approved offload request reply comprising login information in the form of a one time password to enable the mobile subscriber device to establish a connection to an accessible access point of the secondary communication medium.

30. The method of offloading according to claim 19 further comprising authenticating any attempted establishment of a new data channel link over the secondary communication medium by a mobile subscriber device.

31. The method of offloading according to claim 19, wherein said offload management system comprises a policy server and a policy database that stores an offload profile for each mobile subscriber device, each offload profile comprising information indicative of whether the mobile subscriber device is approved for offloading.

32. The method of offloading according to claim 19, wherein said offload management system comprises a resource server that is configured to maintain and provide resource status information indicative of the available capacity on a secondary communication infrastructure which provides the secondary communication medium.

33. The method a92 of offloading according to claim 32 wherein a determination of the best accessible access point is based on information stored in said resource server.

34. The method of offloading according to claim 19 wherein said offloading management system comprises an authentication, authorization and accounting server configured to authenticate and authorize new connections to the secondary communication medium by offloading mobile subscriber devices and to receive data usage accounting information for each mobile subscriber connected to a secondary communication infrastructure which provides the secondary communication medium.

35. The method of offloading according to claim 19, further comprising the step of determining, by said policy server of said offload management system the presence of a best accessible access point for the secondary communication medium in a vicinity of the mobile subscriber device based on signal strength and capacity.

36. The method of offloading according to claim 19 wherein said determination whether to offload said mobile subscriber device is based on a type of application program run on the mobile subscriber device, a type of data session required, or a best available access point.

37. A method of offloading a mobile subscriber device from a primary communication medium to a secondary communication medium during a data session required by an activated application program of the mobile subscriber device, comprising the steps of:

(a) detecting initiation of a data session by the mobile subscriber device over a data channel link on the primary communication medium;

(b) sending an offload request over the primary communication medium to an offload management system upon detection of the data session;

(c) receiving an offload request reply from the offload management system, the reply comprising either an approved offload request reply comprising login information for the secondary communication medium or a denied offload request reply, the secondary communication medium having a different connectivity protocol from the primary communication medium; and (d) initiating a new data channel link over the secondary communication medium for the data session based on an approved offload request reply based on an offload profile for said mobile subscriber device indicative of whether said mobile subscriber device is allowed to offload to the secondary communication medium, or continuing the data session over the data channel link on the primary communication medium for a denied offload request.

38. The method of offloading according to claim 37 wherein step (a) comprises detecting the activation of an application program on the mobile subscriber device that requires a data session.

39. The method of offloading according to claim 37 wherein step (b) comprises sending an offload request comprising identification information indicative of the identity of the mobile subscriber device.

40. The method of offloading according to claim 37 wherein step (b) comprises sending an offload request comprising data session information indicative of the type of data session required by the mobile subscriber device.

41. The method of offloading according to claim 40 wherein the data session information is indicative of the intended data usage by the mobile subscriber device.

42. The method of offloading according to claim 40 wherein the data session information is indicative of the type of application program being run on the mobile subscriber device that requires the data session.

43. The method of offloading according to claim 37 further comprising the step of initiating the mobile subscriber device to scan for accessible access points of the secondary communication medium in range of the mobile subscriber device and wherein step (b) comprises sending an offload request that comprises access point information indicative of the accessible access points for connecting the mobile subscriber device to the secondary communication medium based on the scan.

44. The method of offloading according to claim 43 wherein the access point information comprises access point identification information indicative of the identity of the accessible access points and signal strength information indicative of the signal strengths of the accessible access points.

45. The method of offloading according to claim 44 wherein the access point information comprises a list of the accessible access points ranked for performance according to signal strength relative to the mobile subscriber device.

46. The method of offloading according to claim 37 further comprising the step of initiating the mobile subscriber device to detect location information indicative of the location of the mobile subscriber device and wherein step (b) comprises sending an offload request that comprises the location information.

47. The method of offloading according to claim 37 wherein step (c) comprises receiving an approved offload request reply from the offload management system that further comprises a list of accessible access points for connecting the mobile subscriber device to the secondary communication medium, the list being ranked for performance according to signal strength relative to the mobile subscriber device, and wherein step (d) comprises sequentially attempting to initiate a connection to an access point on the list in order of highest ranking until a successful connection is established for the new data channel link over the secondary communication medium for an approved offload request reply.

48. The method of offloading according to claim 37 wherein step (c) comprises receiving an approved offload request reply from the offload management system that further comprises a list of accessible access points for connecting the mobile subscriber device to the secondary communication medium, the list being ranked for performance according to the distance between each access point and the location of the mobile subscriber device, and wherein step (d) comprises sequentially attempting to initiate a connection to an access point on the list in order of highest ranking until a successful connection is established for the new data channel link over the secondary communication medium for an approved offload request reply.

49. The method of offloading according to claim 37, wherein said offload management system comprises a policy server and a policy database that stores an offload profile for each mobile subscriber device, each offload profile comprising information indicative of whether the mobile subscriber device is approved for offloading.

50. The method of offloading according to claim 49, further comprising the step of determining, by said policy server of said offload management system a presence of the best accessible access point for the secondary communication medium in a vicinity of the mobile subscriber device based on signal strength and capacity.

51. The method of offloading according to claim 37, wherein said offload management system comprises a resource server that is configured to maintain and provide resource status information indicative of the available capacity on a secondary communication infrastructure which provides the secondary communication medium.

52. The method of offloading according to claim 51 wherein a determination of the best accessible access point is based on information stored in said resource server.

53. The method of offloading according to claim 37 wherein said offloading management system comprises an authentication, authorization and accounting server configured to authenticate and authorize new connections to the secondary communication medium by offloading mobile subscriber devices and to receive data usage accounting information for each mobile subscriber connected to a secondary communication infrastructure which provides the secondary communication medium.

54. The method of offloading according to claim 37 wherein said determination whether to offload said mobile subscriber device is based on a type of application program run on the mobile subscriber device, a type of data session required, or a best available access point.

\* \* \* \* \*